US011461726B2

(12) United States Patent
Newman et al.

(10) Patent No.: US 11,461,726 B2
(45) Date of Patent: Oct. 4, 2022

(54) BUSINESS INSIGHT GENERATION SYSTEM

(71) Applicant: ADP, Inc., Roseland, NJ (US)

(72) Inventors: Kurt Newman, Columbus, GA (US);
Debashis Ghosh, Charlotte, NC (US);
Ramsay Cole, Brooklyn, NY (US)

(73) Assignee: ADP, Inc., Roseland, NJ (US)

( * ) Notice: Subject to any disclaimer, the term of this patent is extended or adjusted under 35 U.S.C. 154(b) by 61 days.

(21) Appl. No.: 16/253,117

(22) Filed: Jan. 21, 2019

(65) Prior Publication Data

US 2020/0234216 A1 Jul. 23, 2020

(51) Int. Cl.
*G06Q 10/06* (2012.01)
*G06Q 10/10* (2012.01)

(52) U.S. Cl.
CPC ..... *G06Q 10/06393* (2013.01); *G06Q 10/105* (2013.01); *G06Q 10/067* (2013.01)

(58) Field of Classification Search
CPC .......... G06Q 10/06393; G06Q 10/105; G06Q 10/067
See application file for complete search history.

(56) References Cited

U.S. PATENT DOCUMENTS

| | | | |
|---|---|---|---|
| 6,751,626 B2 | 6/2004 | Brown et al. | |
| 8,200,527 B1 * | 6/2012 | Thompson | G06Q 10/06398 705/7.39 |
| 8,571,909 B2 * | 10/2013 | Miller | G06Q 10/00 705/7.11 |
| 9,461,876 B2 * | 10/2016 | Van Dusen | G06Q 10/10 |
| 9,569,729 B1 * | 2/2017 | Oehrle | G06Q 10/063 |
| 10,621,535 B1 * | 4/2020 | Lawrence | G06Q 10/06393 |
| 2002/0059264 A1 | 5/2002 | Fleming et al. | |
| 2004/0039619 A1 * | 2/2004 | Zarb | G06Q 10/0637 705/7.13 |

(Continued)

OTHER PUBLICATIONS

Bonhomme et al., "A Distributional Framework for Matched Employer Employee Data," Oct. 2018, pp. 1-45. http://lamadon.com/paper/blm.pdf.

(Continued)

*Primary Examiner* — Rutao Wu
*Assistant Examiner* — Stephen S Swartz
(74) *Attorney, Agent, or Firm* — Yee & Associates, P.C.

(57) ABSTRACT

A method, apparatus, and computer program product for digitally presenting statistically-relevant business insights into a set of business metrics for an organization. A computer system identifies a set of organizational characteristics from human resources data of employees of a plurality of organizations, and applies a selected inclusion criteria to the set of organizational characteristics to identify a set of candidate organizations. The computer system identifies a set of benchmark organizations from the set of candidate organizations, and creates a fixed panel of the benchmark organizations. The computer system applies the fixed panel to the human resources data of employees of a plurality of organizations to create an analysis dataset that consists of human resources data of employees of the benchmark organizations. The computer system generates a business insight into the set of business metrics of the organization based on the analysis dataset, and digitally presents the business insight.

27 Claims, 4 Drawing Sheets

(56) References Cited

U.S. PATENT DOCUMENTS

| | | | | |
|---|---|---|---|---|
| 2004/0199445 | A1* | 10/2004 | Eder | G06Q 40/025 |
| | | | | 705/35 |
| 2005/0049911 | A1* | 3/2005 | Engelking | G06Q 10/0639 |
| | | | | 705/7.37 |
| 2007/0156478 | A1* | 7/2007 | Breene | G06F 8/10 |
| | | | | 705/7.12 |
| 2008/0015871 | A1* | 1/2008 | Eder | G06Q 10/067 |
| | | | | 706/21 |
| 2008/0015912 | A1* | 1/2008 | Rosenthal | G06Q 30/02 |
| | | | | 705/7.14 |
| 2009/0319344 | A1* | 12/2009 | Tepper | G06Q 10/06393 |
| | | | | 705/7.39 |
| 2012/0303504 | A1* | 11/2012 | Eder | G06Q 40/06 |
| | | | | 705/35 |
| 2013/0035971 | A1* | 2/2013 | Bruce | G06Q 10/105 |
| | | | | 705/7.11 |
| 2013/0346282 | A1* | 12/2013 | Leachman | G06Q 30/0204 |
| | | | | 705/37 |
| 2014/0108074 | A1* | 4/2014 | Miller | G06Q 10/00 |
| | | | | 705/7.11 |
| 2014/0344271 | A1* | 11/2014 | Bartram | G06Q 10/10 |
| | | | | 707/737 |
| 2015/0134694 | A1* | 5/2015 | Burke | G06Q 10/06398 |
| | | | | 707/769 |
| 2015/0161567 | A1* | 6/2015 | Mondal | G06Q 10/1053 |
| | | | | 705/321 |
| 2015/0339938 | A1* | 11/2015 | Sampath | G09B 7/02 |
| | | | | 434/362 |
| 2016/0048807 | A1* | 2/2016 | Kreuter | G06Q 10/1053 |
| | | | | 705/321 |
| 2017/0236081 | A1* | 8/2017 | Grady Smith | G06Q 10/067 |
| | | | | 705/7.36 |
| 2018/0114238 | A1* | 4/2018 | Treiser | G06Q 50/01 |
| 2018/0189691 | A1* | 7/2018 | Oehrle | G06Q 10/063 |

OTHER PUBLICATIONS

Huselid et al., "Methodological Issues in Cross-Sectional and Panel Estimates of the Human Resource-Firm Performance Link," Industrial Relations, vol. 35, No. 3, pp. 400-422, Jul. 1996.

* cited by examiner

BUSINESS INSIGHT GENERATION SYSTEM

BACKGROUND INFORMATION

1. Field

The present disclosure relates generally to an improved computer system and, in particular, to a method and apparatus for accessing information in a computer system. Still more particularly, the present disclosure relates to a method, a system, and a computer program product for digitally generating and presenting statistically-relevant business insights into a set of business metrics for an organization.

2. Background

Information systems are used for many different purposes. For example, an information system may be used to process payroll to generate paychecks for employees in an organization. Additionally, an information system also may be used by a human resources department to maintain benefits and other records about employees. For example, a human resources department may manage health insurance plans, wellness plans, and other programs and organizations using an employee information system. As yet another example, an information system may be used to hire new employees, assign employees to projects, perform reviews for employees, and other suitable operations for the organization. As another example, a research department in the organization may use an information system to store and analyze information to research new products, analyze products, or for other suitable operations.

Currently used information systems include databases. These databases store information about the organization. For example, these databases store information about employees, products, research, product analysis, business plans, and other information about the organization.

Information about the employees may be searched and viewed to perform various operations within an organization. However, this type of information in currently used databases may be cumbersome and difficult to access relevant information in a timely manner that may be useful to performing an operation for the organization. For example, while regular aggregation methods to generate metrics can be used to get a bird's eye view of an organization, it may often be the case that a single metric in itself is not insightful. Rather, a significant change in the value of the metric as observed over a period of time or compared with sections of the organization may provide a deeper understanding into the different conditions that drive those business metrics. For example, an insight into the turnover rate for an organization that identifies "turnover rate of sales department has increased 8% on the year as compared to last year" is more insightful than "turnover rate in a company 12% this year."

Therefore, it would be desirable to have a method and apparatus that take into account at least some of the issues discussed above, as well as other possible issues. For example, it would be desirable to have a method and apparatus that overcome a technical problem of presenting a potentially competitive human resource migration model for an organization.

SUMMARY

An embodiment of the present disclosure provides a method for digitally presenting statistically-relevant business insights into a set of business metrics for an organization. A computer system identifies a set of organizational characteristics from human resources data of employees of a plurality of organizations. The computer system applies a selected inclusion criteria to the set of organizational characteristics to identify a set of candidate organizations. The computer system identifies a set of benchmark organizations from the set of candidate organizations. The computer system creates a fixed panel of the benchmark organizations. The computer system applies the fixed panel to the human resources data of employees of a plurality of organizations to create an analysis dataset. The analysis dataset consists of human resources data of employees of the benchmark organizations. The computer system generates a business insight into the set of business metrics of the organization based on the analysis dataset. The computer system digitally presents the business insight.

Another embodiment of the present disclosure provides a computer system for digitally presenting statistically-relevant business insights into a set of business metrics for an organization. The computer system comprises a hardware processor, a display system, a panel generator, and an insight engine in communication with the hardware processor and the display system. The panel generator identifies a set of organizational characteristics from human resources data of employees of a plurality of organizations. The panel generator applies a selected inclusion criteria to the set of organizational characteristics to identify a set of candidate organizations. The panel generator identifies a set of benchmark organizations from the set of candidate organizations. The panel generator creates a fixed panel of the benchmark organizations. The insight engine applies the fixed panel to the human resources data of employees of a plurality of organizations to create an analysis dataset. The analysis dataset consists of human resources data of employees of the benchmark organizations. The insight engine generates a business insight into the set of business metrics of the organization based on the analysis dataset. The computer system digitally presents the business insight.

Yet another embodiment of the present disclosure provides a computer program product for digitally presenting statistically-relevant business insights into a set of business metrics for an organization. The computer program product comprises a non-transitory computer readable storage media and program code, stored on the computer readable storage media. The program code includes code for identifying a set of organizational characteristics from human resources data of employees of a plurality of organizations. The program code includes code for applying a selected inclusion criteria to the set of organizational characteristics to identify a set of candidate organizations. The program code includes code for identifying a set of benchmark organizations from the set of candidate organizations. The program code includes code for creating a fixed panel of the benchmark organizations. The program code includes code for applying the fixed panel to the human resources data of employees of a plurality of organizations to create an analysis dataset. The analysis dataset consists of human resources data of employees of the benchmark organizations. The program code includes code for generating a business insight into the set of business metrics of the organization based on the analysis dataset. The program code includes code for digitally presenting the business insight.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account one or more different considerations. For example, the illustrative embodiments recognize and take into account that an employer may need information about effects of human resources information on business metrics when performing certain operations. The illustrative embodiments also recognize and take into account that searching information systems for business insights into human resources information, and identifying the effects of the human resources information on business metrics, may be more cumbersome and time-consuming than desirable.

The illustrative embodiments also recognize and take into account that digitally presenting statistically-relevant business insights into business metrics for an organization may facilitate accessing information about appropriate human resources data when performing operations for an organization. The illustrative embodiments also recognize and take into account that identifying business insights into human resources data and their effects on business metrics may still be more difficult than desired.

Thus, the illustrative embodiments provide a method, an apparatus, and a computer program product for digitally presenting statistically-relevant business insights into a set of business metrics for an organization. A computer system identifies a set of organizational characteristics from human resources data of employees of a plurality of organizations. The computer system applies a selected inclusion criteria to the set of organizational characteristics to identify a set of candidate organizations. The computer system identifies a set of benchmark organizations from the set of candidate organizations. The computer system creates a fixed panel of the benchmark organizations. The computer system applies the fixed panel to the human resources data of employees of a plurality of organizations to create an analysis dataset. The analysis dataset consists of human resources data of employees of the benchmark organizations. The computer system generates a business insight into the set of business metrics of the organization based on the analysis dataset. The computer system digitally presents the business insight.

Figure 1:
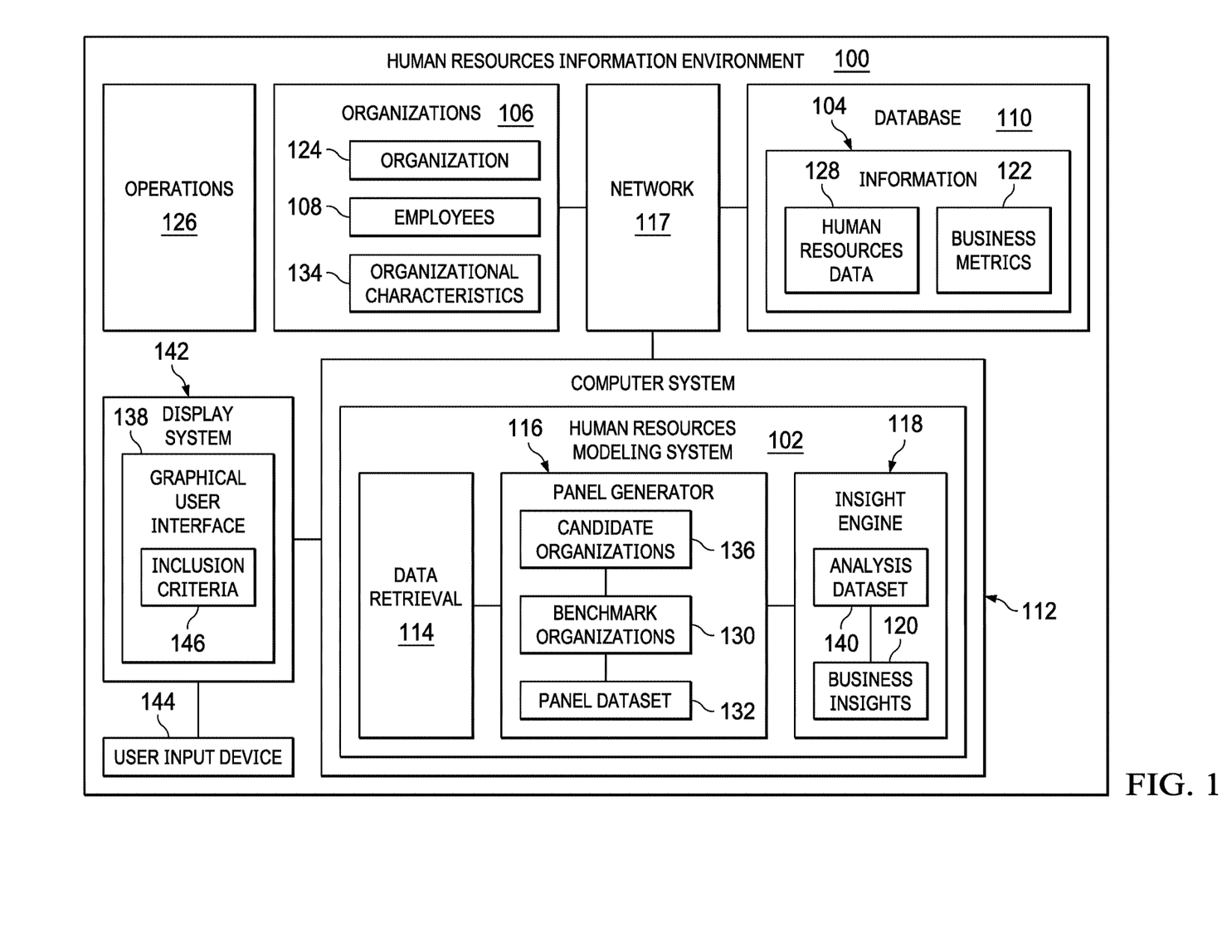
FIG. 1 is a block diagram of a human resources information environment in accordance with an illustrative embodiment.

With reference now to the figures and, in particular, with reference to FIG. 1, an illustration of a block diagram of a human resources information environment is depicted in accordance with an illustrative embodiment. As depicted, human resources information environment 100 includes human resources modeling system 102.

Human resources modeling system 102 may take different forms. For example, human resources modeling system 102 may be selected from one of an employee information system, a research information system, a sales information system, an accounting system, a payroll system, a human resources system, or some other type of information system that stores and provides access to information 104.

Information 104 can include information about organizations 106 and employees 108 of organizations 106. Information 104 may include, for example, at least one of information about people, products, research, product analysis, business plans, financials, or other information relating to organizations 106 and employees 108. As depicted, information 104 is stored on database 110.

As used herein, the phrase "at least one of," when used with a list of items, means different combinations of one or more of the listed items may be used and only one of each item in the list may be needed. In other words, "at least one of" means any combination of items and number of items may be used from the list, but not all of the items in the list are required. The item may be a particular object, thing, or a category.

For example, without limitation, "at least one of item A, item B, or item C" may include item A, item A and item B, or item B. This example also may include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

Organizations 106 may include, for example, a corporation, a partnership, a charitable organization, a city, a government agency, or some other suitable type of organization. Employees 108 are people who are employed by or associated with one or more of organizations 106. For example, employees 108 can include at least one of employees, administrators, managers, supervisors, and third parties associated with organization 106.

Human resources modeling system 102 may be implemented in computer system 112. Computer system 112 is a physical hardware system and includes one or more data processing systems. When more than one data processing system is present, those data processing systems may be in communication with each other using a communications medium. The communications medium may be a network, such as network 117. The data processing systems may be selected from at least one of a computer, a server computer, a workstation, a tablet computer, a laptop computer, a mobile phone, or some other suitable data processing system.

In this illustrative example, human resources modeling system 102 includes a number of different components. As used herein, "a number of" means one or more components. As depicted, human resources modeling system 102 includes data retrieval 114, panel generator 116, and insight engine 118.

In this illustrative example, insight engine 118 generates business insights 120. As used herein, a "business insight" is an actionable, data-driven finding that creates business value impacting one or more of business metrics 122. A business insight provides the "aha moment" for organization 124, which can trigger a smart business decision, or an idea for a new feature or business process or marketing strategy. In order for the value to be realized, business insights 120 provide useful and actionable information that is easy to comprehend. Business insights 120 can be time bound and readily available, enabling organization 106 to uncover potential issues that may otherwise be missed within information 104.

By generating business insights 120, insight engine 118 enables the performance of operations 126 by organization 124 that may promote desired changes to business metrics 122 of organization 124. For example, insight engine 118 allows organization 124 to perform operations 126 based on a comparison to human resources data 128 for a peer group of benchmark organizations 130 identified from organizations 106.

In one illustrative example, insight engine 118 generates business insights 120 into business metrics 122 of organizations 106. Business metrics 122 are quantifiable measures that track and assess the status of specific business processes or operations, such as operations 114.

In one illustrative example, business metrics 122 can include human capital management metrics that relate to employees 108 of organizations 106. Human capital management metrics can include, for example, but not limited to, at least one of attrition metrics, stability and experience metrics, employee equity metrics, organization metrics, workforce metrics, and compensation metrics, as well as other relevant metrics.

In one illustrative example, business metrics 122 can include attrition metrics that relate to attrition of employees 108. Attrition metrics can include, for example, but not limited to, at least one of a New Hire Turnover Rate metric, a Terminations metric, a Termination Reasons metric, a Hires metric, a Turnover Rate metric, and a Retention metric, as well as other relevant metrics.

In one illustrative example, business metrics 122 can include stability metrics that relate to a stability of employees 108 within organizations 106. Stability metrics can include, for example, but not limited to, at least one of a Retirement metric, a Retirement Eligibility metric, an Average Retirement Age metric, a Headcount by Age metric, a Headcount by Generation metric, and a Projected Retirement metric, as well as other relevant metrics.

In one illustrative example, business metrics 122 can include employee equity metrics that relate to an equity among employees 108 of organizations 106. Employee equity metrics can include, for example, but not limited to, at least one of a Female Percentage metric, an Average Age metric, and a Minority Headcount metric, as well as other relevant metrics.

In one illustrative example, business metrics 122 can include organization metrics that relate to a tenure of employees 108 in organizations 106. Organization metrics can include, for example, but not limited to, at least one of an Average Time to Promotion metric, a Comp-a-Ratio metric, a Headcount by Tenure metric, an Internal Mobility metric, a Span of Control metric, a Comp-a-Ratio v Performance metric, and an Average Tenure metric, as well as other relevant metrics.

In one illustrative example, business metrics 122 can include workforce metrics that relate to a workforce status of employees 108 in organizations 106. Workforce metrics can include, for example, but not limited to, at least one of a Leave Percentage metric, a Part Time Headcount metric, a Temporary Employee Headcount metric, an Absence metric, an Absences to Overtime metric, a Labor Cost metric, a Leave Hours metric, a Non-Productive Time metric, a Competency Gap metric, and a Strongest Weakest Competency metric, as well as other relevant metrics.

In one illustrative example, business metrics 122 can include compensation metrics that relate to a compensation of employees 108 by organizations 106. Compensation metrics can include, for example, but not limited to, at least one of an Earnings per Full-Time Employee metric, an Earnings metric, an Overtime Cost metric, an Average Earnings metric, a Benefits Cost metric, a Benefits Enrollment metric, a Benefit Contribution metric, and an Overtime Pay metric, as well as other relevant metrics.

When companies want to compare themselves to a peer group, creating that appropriate peer group correctly is very important. The inclusion or exclusion of a specific population can have a dramatic impact on the conclusions drawn from any analysis of the dataset. Inclusion criteria, along with exclusion criteria, make up the selection or eligibility criteria used to rule in or out the target population for a peer group. Proper selection of inclusion criteria will ensure the homogeneity of the sample population, reduce confounding, and increase the likelihood of finding a true association among the explanatory variables in the peer group.

Insight engine 118 uses panel dataset 132 of benchmark organizations 130 to create a desired one of analysis dataset 140. Inclusion of benchmark organizations 130 in panel dataset 140 is based in part on specific inclusion criteria identified from human resources data 128.

In statistics and econometrics, panel data, sometimes also referred to as longitudinal data or cross-sectional time-series data, are multi-dimensional data involving measurements over time. Panel data contains observations of multiple phenomena obtained over multiple time periods for the same firms or individuals. In contrast to repeated cross-sectional data, panel data allows for the measurement of within-sample change over time, enabling the measurement of the duration of events, and recording the timing of various events. Given well-organized panel data, the panel data provides ways of dealing with heterogeneity and examining fixed and/or random effects in the dataset.

A panel dataset has multiple entities, each of which has repeated measurements at different time periods. A panel dataset contains n entities or subjects, each of which includes T observations measured at 1 through t time period. Thus, a panel has the form $x_{it}$, i=1, . . . , N, t=1, . . . , T where i is the individual dimension and t is the time dimension.

Ideally, panel data is measured at regular time intervals (e.g., year, quarter, and month). A panel dataset that observes the same individuals (or entities) for each period is called a fixed panel. Conversely, if individuals change from one period to the next, the dataset is a rotating panel.

Panel generator 116 creates panel dataset 132 of benchmark organizations 130 based on similarities among critical characteristics identified within human resources data 128. Panel dataset 132 is a fixed panel of organizations that can be used as peer groups for organization 124. Panel dataset 132 is custom designed based on similarities among critical characteristics of organizations 106. Panel generator 116 identifies these similarities within human resources data 128. The identified critical characteristics are the inclusion criteria used to identify which of organizations 106 will be included in panel dataset 132. This customization of panel dataset 132 enables detailed benchmarking by organization 124 for whom the peer group was custom created.

Panel generator 116 and insight engine 118 may be implemented in software, hardware, firmware, or a combination thereof. When software is used, the operations performed by panel generator 116 and insight engine 118 may be implemented in program code configured to run on hardware, such as a processor unit. When firmware is used, the operations performed by panel generator 116 and insight engine 118 may be implemented in program code and data and stored in persistent memory to run on a processor unit. When hardware is employed, the hardware may include circuits that operate to perform the operations in panel generator 116 and insight engine 118.

In the illustrative examples, the hardware may take the form of a circuit system, an integrated circuit, an application-specific integrated circuit (ASIC), a programmable logic device, or some other suitable type of hardware configured to perform a number of operations. With a programmable logic device, the device may be configured to perform the number of operations. The device may be reconfigured at a later time or may be permanently configured to perform the number of operations. Programmable logic devices include, for example, a programmable logic array, programmable array logic, a field programmable logic array, a field programmable gate array, and other suitable hardware devices. Additionally, the processes may be implemented in organic components integrated with inorganic components and may be comprised entirely of organic components, excluding a human being. For example, the processes may be implemented as circuits in organic semiconductors.

Data retrieval 114 identifies facts and dimensions from human resources data 128, and provides the identified information to panel generator 116. As used herein, "facts" are human resources data 128 that correspond to a particular one of business metrics 122; and "dimensions" are groups of hierarchies and descriptors that define facts.

In one illustrative example, panel generator 116 identifies a set of organizational characteristics 134 from human resources data 128 of employees 108 of a plurality of organizations 106. Organizational characteristics 134 can include characteristics such as, but not limited to, a payroll services beginning date, a payroll services ending date, an industry of the organization, a sub-industry of the organization, a geographic region of the organization, a number of employees of the organization, a Collection of Job Codes of the organization, a Range of Salary Amounts of the organization, and a Range of Part-Time to Full-Time Employees of the organization, as well as other suitable characteristics.

Panel generator 116 applies a selected inclusion criteria to the set of organizational characteristics 134 to identify a set of candidate organizations 136. In one illustrative example, human resources modeling system 102 presents the identified set of organizational characteristics 134 in graphical user interface 138. The user can then select one or more of the set of organizational characteristics 134 to be applied as an inclusion criteria.

Data and datasets are not objective; they are creations of human design. Hidden biases in both the collection and analysis stages present considerable risks, and are as important to the big-data equation as the numbers themselves. Bias in panel data can be present in the dataset itself.

For example, endogeneity broadly refers to situations in which an explanatory variable is correlated with the error term. consider that endogeneity presumes some functional relationship between explanatory variables and/or the dependent variable in addition to the relationship that is to be estimated. Endogeneity bias arises when the value of one independent variable is dependent on the value of other predictor variables. Because of this dependency, a significant correlation can exist between the unobserved factors contributing to both the endogenous independent variable and the dependent variable, which results in biased estimators (incorrect regression coefficients) (2). Endogeneity bias can lead to inconsistent estimates, incorrect inferences, and multicollinearity, all of which may provide misleading conclusions and inappropriate theoretical interpretations.

Panel generator 116 identifies a set of benchmark organizations 130 from the set of candidate organizations 136. Panel generator 116 creates panel dataset 132 from the set of benchmark organizations 130. In one illustrative example, panel dataset 132 is a fixed panel dataset.

By selecting only benchmark organizations 130, panel generator 116 eliminates or reduces endogeneity bias that may be present within human resources data 128 for the set of candidate organizations 136.

For example, when employment in one industry is compared with employment in a different industry, it is very important to eliminate specific geographic bias that may exist within the data. Ideally, all the industries are observed in the same geographies. If one industry is not adequately represented in one geography, that geography should be excluded from the analysis. Identifying the potential bias in the data requires human resources data 128.

In another example, when employment in one geographic region is compared to a different geographic region, or across time, it is very important to eliminate specific company bias that may exist within the data. For example, within a particular industry, consider a particular organization that is primarily located within a regionalized geographic area. If that industry is to be compared across regions that include geographic areas where the particular organization does not exist, then a decision needs to be made about what to do with human resources data for that particular organization. If the analysis involves trends across time, the human resources data must be evaluated appropriately for companies that are present at one point in time, but not present at a different point in time.

Insight engine 118 applies the fixed one of panel dataset 132 to human resources data 128 of employees 108 of a plurality of organizations 106 to create analysis dataset 140. Analysis dataset 140 consists of human resources data 128 of employees 108 of benchmark organizations 130. In this manner, the aggregation of human resources data 128 into analysis dataset 140 is limited to data for those employees 108 that work for benchmark organizations 130 enumerated in panel dataset 132, and that meet the selected inclusion criteria.

In contrast to panel dataset 132, analysis dataset 140 is not necessarily a fixed panel. Analysis dataset 140 may be a rotating panel and/or an unbalanced panel, thereby accounting for employee changes in turnover within benchmark organizations 130.

Insight engine 118 generates business insights 120 into the set of business metrics 122 of the organization based on analysis dataset 140.

For example, insight engine 118 can model analysis dataset 140 using one or more panel data regression models. Panel data regression models examine group (individual-specific) effects, time effects, or both in order to deal with heterogeneity or an individual effect that may or may not be observed in analysis dataset 140.

Panel data may have an individual (group) effect, a time effect, or both, which are analyzed by a fixed effect and/or random effect models. A fixed effect model examines if intercepts vary across group or time period, whereas a random effect model explores differences in error variance components across an individual or a time period. A one-way model includes only one set of dummy variables (e.g., firm1, firm2, . . . ), while a two-way model considers two sets of dummy variables (e.g., city1, city2, . . . and year1, year2, . . . ).

As stated above, the correlation between the dependent variables can create significant multicollinearity. "Multicollinearity" refers to an explanatory variable that is correlated with other an explanatory variable. Multicollinearity occurs when a model includes multiple factors that are correlated not just to a response variable, but also to each other. Multicollinearity suggests that one or more of the explanatory variables are linearly related in a sample, but that there is no real causal relationship between them.

Multicollinearity biases the interpretation towards the null hypothesis, increasing the likelihood of a type II error that falsely infers the absence of a correlation within the dataset. Because analysis dataset 140 includes human resources data 128 for only benchmark organizations 130, panel generator 116 eliminates or reduces endogeneity bias that may be present within the set of candidate organizations 136, thereby reducing or eliminating multicollinearity among organizational characteristics 134 that are modeled by insight engine 118.

Insight engine 118 then digitally presents business insights 120 for organization 124. In this illustrative example, computer system 112 can display business insights 120 on display system 142. In this illustrative example, display system 142 can be a group of display devices. A display device in display system 142 may be selected from one of a liquid crystal display (LCD), a light emitting diode (LED) display, an organic light emitting diode (OLED) display, and other suitable types of display devices.

By determining business insights 120, insight engine 118 enables more efficient performance of operations 126 for organization 106. For example, organization 106 can perform operations 126, such as, but not limited to, at least one of hiring, benefits administration, payroll, performance reviews, forming teams for new products, assigning research projects, or other suitable operations consistent with business insights 120.

In this illustrative example, business insights 120 are displayed in graphical user interface 138 on display system 142. An operator may perform operations 126 by interacting with graphical user interface 138 through user input generated by one or more of user input device 144, such as, for example, a mouse, a keyboard, a trackball, a touchscreen, a stylus, or some other suitable type of user input device.

Operations 126 that are performed consistent with business insights 120 allow organization 124 to implement a human capital resources management strategy that may promote desired changes to business metrics 122 of organization 124. For example, insight engine 118 allows organization 124 to perform operations 126 based on a comparison to human resources data 128 for a peer group of benchmark organizations 130 identified from organizations 106.

In this illustrative example, human resources modeling system 102 digitally presents statistically-relevant ones of business insights 120 into a set of business metrics 122 for organization 124. Panel generator 116 identifies a set of organizational characteristics 134 from human resources data 128 of employees 108 of a plurality of organizations 106. Panel generator 116 applies a selected inclusion criteria 146 to the set of organizational characteristics 134 to identify a set of candidate organizations 136. Panel generator 116 identifies a set of benchmark organizations 130 from the set of candidate organizations 136. Panel generator 116 creates a fixed panel dataset 132 of benchmark organizations 130. Insight engine 118 applies fixed panel dataset 132 to human resources data 128 of employees 108 of a plurality of organizations 106 to create analysis dataset 140, wherein analysis dataset 140 consists of human resources data 128 of employees 108 of benchmark organizations 130. Insight engine 118 generates business insights 120 into the set of business metrics 122 of organization 124 based on analysis dataset 140. Insight engine 118 digitally presents business insight 120.

The illustrative example in FIG. 1 and the examples in the other subsequent figures provide one or more technical solutions to overcome a technical problem of determining statistically-relevant insights into human resources data for an organization that make the performance of operations for an organization more cumbersome and time-consuming than desired. For example, when organization 124 performs operations 126 consistent with business insights 120, organization 124 implements a human capital resources management strategy in a manner that positively affects business metrics 122 based on identified correlations in human resources data 128 of a custom fixed panel dataset 132 of comparable organizations.

In this manner, the use of human resources modeling system 102 has a technical effect of determining business insights 120 based on panel dataset 132, thereby reducing time, effort, or both in the performance of operations 126 for organization 124. In this manner, operations 126 performed for organization 124 may be performed more efficiently as compared to currently used systems that do not include human resources modeling system 102. For example, operations, such as, but not limited to, at least one of hiring, benefits administration, payroll, performance reviews, forming teams for new products, assigning research projects, or other suitable operations for organization 124, performed consistently with business insights 120 allow organization 124 to implement a human capital resources management strategy in a manner that positively affects business metrics 122 based on identified correlations in human resources data 124 of a custom fixed panel dataset 132 of comparable organizations.

As a result, computer system 112 operates as a special purpose computer system in which human resources modeling system 102 in computer system 112 enables panel generator 116 and insight engine 118. In this illustrative example, human resources modeling system 102 digitally presents statistically-relevant ones of business insights 118 into a set of business metrics 122 for organization 124. Panel generator 116 identifies a set of organizational characteristics 134 from human resources data 128 of employees 108 of a plurality of organizations 106. Panel generator 116 applies a selected one of inclusion criteria 146 to the set of organizational characteristics 134 to identify a set of candidate organizations 136. Panel generator 116 identifies a set of benchmark organizations 130 from the set of candidate organizations 136. Panel generator 116 creates a fixed panel 132 of benchmark organizations 130. Insight engine 118 applies fixed panel 132 to human resources data 128 of employees 108 of a plurality of organizations 106 to create analysis dataset 140, wherein analysis dataset 140 consists of human resources data 128 of employees 108 of benchmark organizations 130. Insight engine 118 generates business insights 120 into the set of business metrics 122 of organization 124 based on analysis dataset 140. Insight engine 118 digitally presents business insight 120.

Thus, human resources modeling system 102 transforms computer system 112 into a special purpose computer system as compared to currently available general computer systems that do not have human resources modeling system 102. Currently used general computer systems do not reduce the time or effort needed to determine statistically-relevant ones of business insights 118 based on identified correlations in human resources data 124 of a custom fixed panel dataset 132 of comparable organizations.

Figure 2:
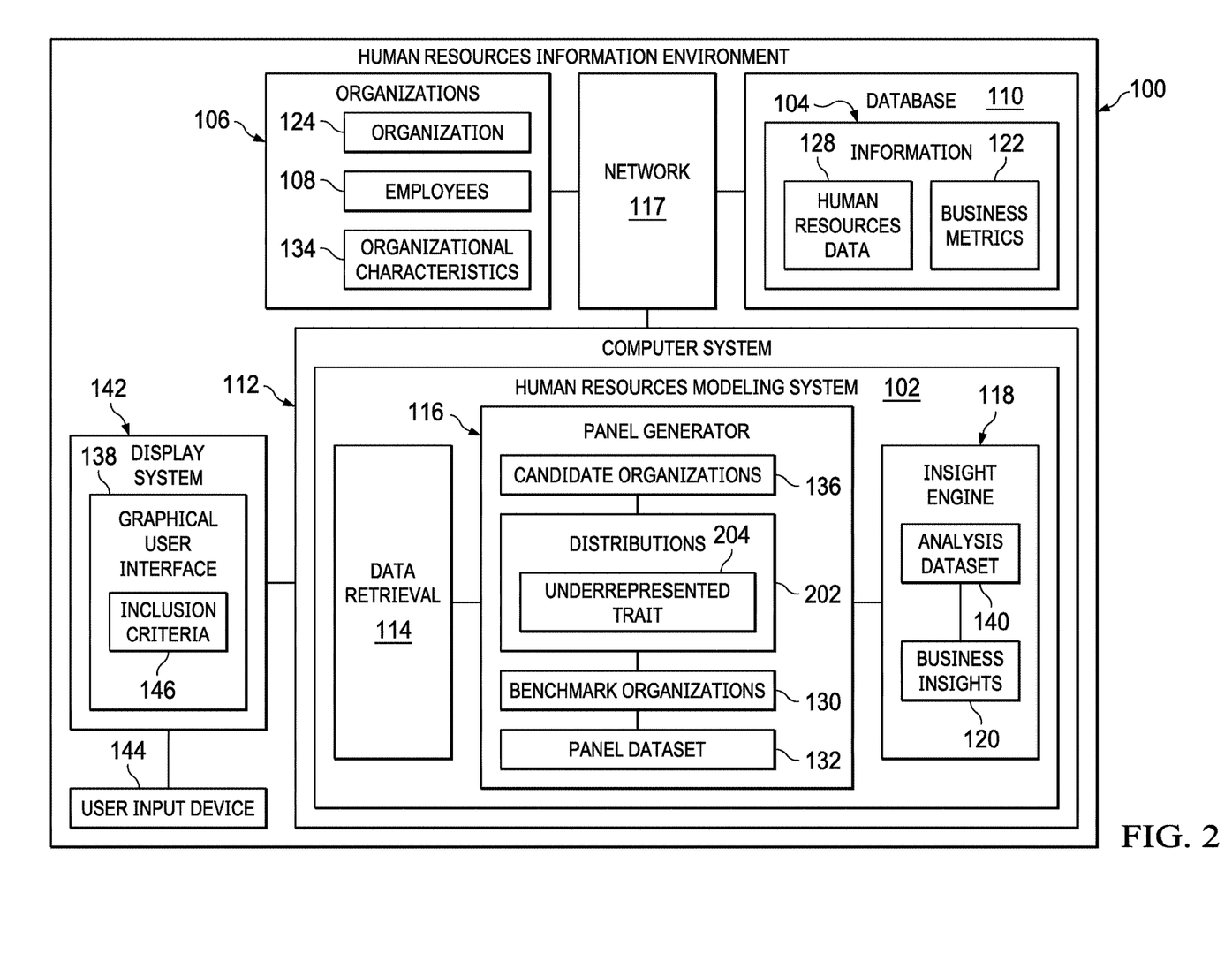
FIG. 2 is a block diagram of a data flow for determining a business insight within a human resources modeling system in accordance with an illustrative embodiment.

With reference next to FIG. 2, an illustration of a block diagram of a data flow for determining a business insight within a human resources modeling system is depicted in accordance with an illustrative embodiment. In the illustrative examples, the same reference numeral may be used in more than one figure. This reuse of a reference numeral in different figures represents the same element in the different figures. As depicted, human resources modeling system 102 is human resources modeling system 102 of FIG. 1.

In one illustrative example, panel generator 116 identifies a set of organizational characteristics 134 from human resources data 128 of employees 108 of a plurality of organizations 106. Organizational characteristics 134 can include characteristics such as, but not limited to, a payroll services beginning date, a payroll services ending date, an industry of the organization, a sub-industry of the organization, a geographic region of the organization, a number of employees of the organization, a Collection of Job Codes of the organization, a Range of Salary Amounts of the organization, and a Range of Part-Time to Full-Time Employees of the organization, as well as other suitable characteristics.

In the illustrative example, panel generator 116 displays inclusion criteria 146 in graphical user interface 138 on display system 142. In this illustrative example, inclusion criteria 146 is at least one organizational characteristic selected from the set of organizational characteristics 134 identified from human resources data 128 of employees 108 of the plurality of organizations 106.

In this illustrative example, panel generator 116 uses selected ones of inclusion criteria 146 to rule in or out different ones of organizations 106 from candidate organizations 136. Proper selection of inclusion criteria 146 will ensure the homogeneity of the sample population, reduce confounding, and increase the likelihood of finding a true association among the explanatory variables in the peer group.

In one illustrative example, panel generator 116 identifies the set of benchmark organizations 130 from candidate organizations 136. Panel generator 116 generates a set of distributions 202 for a set of facts of human resources data 128 based on the selected one of inclusion criteria 146. Statistics are then generated for traits of organizations 106 in relation to the set of distributions 202. In this illustrative example, the set of statistics comprises at least one of an absolute difference, a percentage difference, a Z-score, a p-value, and a percentile rank, as well as other appropriate statistics and combinations thereof.

Panel generator 116 identifies underrepresented trait 204 based on a distribution imbalance in organizational characteristics 134 for the set of candidate organizations 136. Panel generator 116 identifies the set of benchmark organizations 130 from the set of candidate organizations 136, wherein the set of benchmark organizations 130 does not have underrepresented trait 204 of organizational characteristics 134.

For example, when employment in one industry is compared with employment in a different industry, it is very important to eliminate specific geographic bias that may exist within the data. Ideally, all industries should be observed in the same geographies. If one industry is not adequately represented in one geography, i.e., there is a distribution imbalance of a particular geographic trait, panel generator 116 excludes that geography when identifying benchmark organizations 130 and creating panel dataset 132.

In another example, when employment in one geographic region is compared to a different geographic region, or across time, it is very important to eliminate specific company bias that may exist within the data. For example, within a particular industry, consider a particular organization that is primarily located within a regionalized geographic area, thereby creating a distribution imbalance across geographic regions for that particular organization. If that industry is to be compared across regions that include geographic areas where the particular organization does not exist, panel generator 116 excludes the particular organization when identifying benchmark organizations 130 and creating panel dataset 132.

In this illustrative example, insight engine 118 includes machine intelligence that can be implemented using one or more systems such as an artificial intelligence system, a neural network, a Bayesian network, an expert system, a fuzzy logic system, a genetic algorithm, or other suitable types of systems.

Insight engine 118 may model analysis dataset 140 using one or more panel data regression models. Panel data regression models examine group (individual-specific) effects, time effects, or both in order to deal with heterogeneity or individual effects that may or may not be observed. These effects are either fixed or random effects. A fixed effect model examines if intercepts vary across a group or a time period, whereas a random effect model explores differences in error variance components across an individual or a time period. A one-way model includes only one set of dummy variables (e.g., firm1, firm2, . . . ), while a two-way model considers two sets of dummy variables (e.g., city1, city2, . . . and year1, year2, . . . ).

Figure 3:
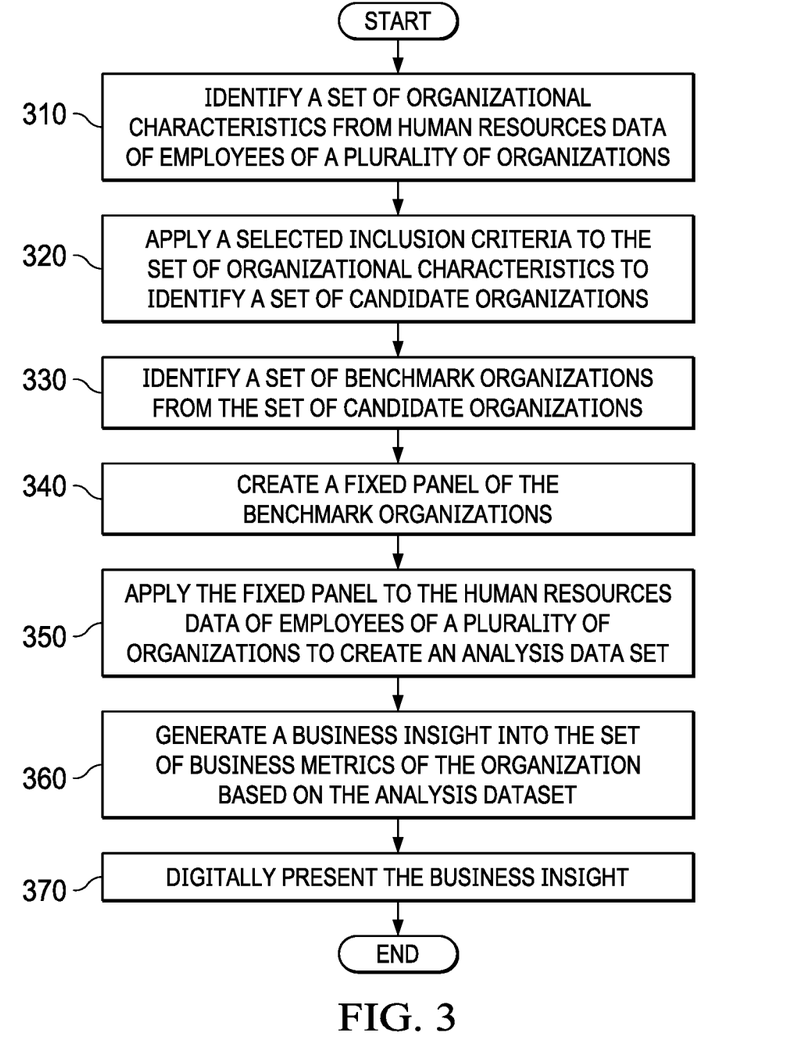
FIG. 3 is a flowchart of a process for digitally presenting statistically-relevant business insights into a set of business metrics for an organization in accordance with an illustrative embodiment.

With reference next to FIG. 3, an illustration of a flowchart of a process for digitally presenting statistically-relevant business insights into a set of business metrics for an organization is depicted in accordance with an illustrative embodiment. The process of FIG. 3 can be a software process implemented in one or more components of a human resources modeling system, such as in panel generator 116 and insight engine 118 of FIGS. 1-2.

Process 300 begins by identifying a set of organizational characteristics from human resources data of employees of a plurality of organizations (step 310). The organizational characteristics can be organizational characteristics 134, shown in block form in FIGS. 1-2.

Process 300 applies a selected inclusion criteria to the set of organizational characteristics to identify a set of candidate organizations (step 320). The inclusion criteria can be inclusion criteria 146, shown in block form in FIGS. 1-2. The set of candidate organizations can be candidate organizations 136, shown in block form in FIGS. 1-2.

Process 300 identifies a set of benchmark organizations from the set of candidate organizations (step 330). The set of benchmark organizations can be benchmark organizations 130, shown in block form in FIGS. 1-2.

Process 300 creates a fixed panel of the benchmark organizations (step 340). The fixed panel can be panel dataset 132, shown in block form in FIGS. 1-2.

Process 300 applies the fixed panel to the human resources data of the employees of the plurality of organizations to create an analysis dataset (step 350). The analysis dataset consists of human resources data of employees of the benchmark organizations, but does not include the human resources data for employees of organizations that are not benchmark organizations. The analysis dataset can be analysis dataset 140, shown in block form in FIGS. 1-2.

Process 300 generates a business insight into the set of business metrics of the organization based on the analysis dataset (step 360). The business insight can be business insight 120, shown in block form in FIGS. 1-2.

Process 300 digitally presents the business insight (step 370), with the process terminating thereafter. The business insight can be presented on a display system, such as display system 142 shown in block form in FIGS. 1-2.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks may be implemented as program code, hardware, or a combination of the program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware. Each block in the flowcharts or the block diagrams may be implemented using special purpose hardware systems that perform the different operations or combinations of special purpose hardware and program code run by the special purpose hardware.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

Figure 4:
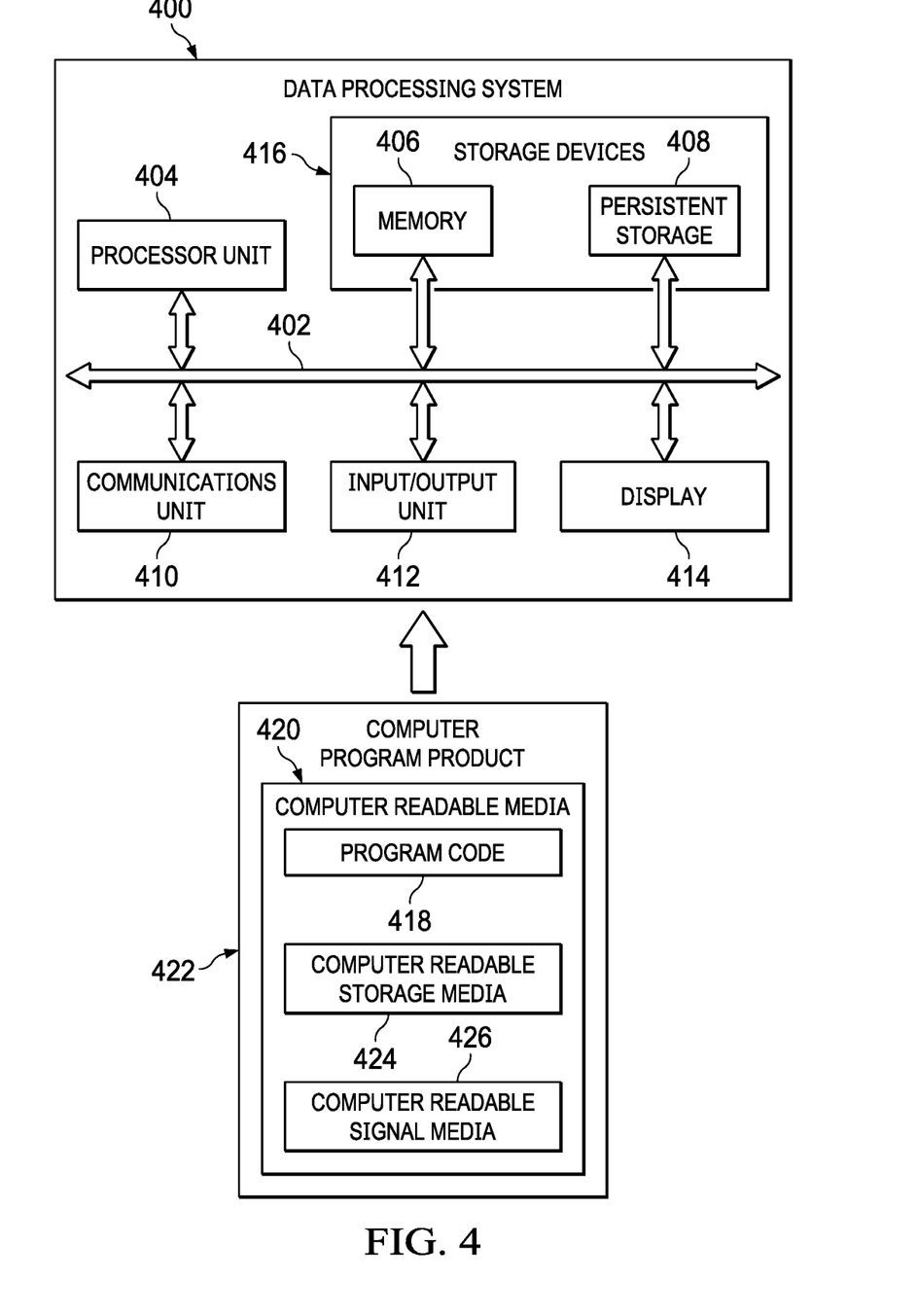
FIG. 4 is a block diagram of a data processing system in accordance with an illustrative embodiment.

Turning now to FIG. 4, an illustration of a block diagram of a data processing system is depicted in accordance with an illustrative embodiment. Data processing system 400 may be used to implement human resources modeling system 102, computer system 112, and other data processing systems that may be used in human resources information environment 100 in FIG. 1. In this illustrative example, data processing system 400 includes communications framework 402, which provides communications between processor unit 404, memory 406, persistent storage 408, communications unit 410, input/output (I/O) unit 428, and display 414. In this example, communications framework 402 may take the form of a bus system.

Processor unit 404 serves to execute instructions for software that may be loaded into memory 406. Processor unit 404 may be a number of processors, a multi-processor core, or some other type of processor, depending on the particular implementation.

Memory 406 and persistent storage 408 are examples of storage devices 416. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 416 may also be referred to as computer readable storage devices in these illustrative examples. Memory 406, in these examples, may be, for example, a random access memory or any other suitable volatile or non-volatile storage device. Persistent storage 408 may take various forms, depending on the particular implementation.

For example, persistent storage 408 may contain one or more components or devices. For example, persistent storage 408 may be a hard drive, a solid state hard drive, a flash memory, a rewritable optical disk, a rewritable magnetic tape, or some combination of the above. The media used by persistent storage 408 also may be removable. For example, a removable hard drive may be used for persistent storage 408.

Communications unit 410, in these illustrative examples, provides for communications with other data processing systems or devices. In these illustrative examples, communications unit 410 is a network interface card.

Input/output unit 412 allows for input and output of data with other devices that may be connected to data processing system 400. For example, input/output unit 412 may provide a connection for user input through at least one of a keyboard, a mouse, or some other suitable input device. Further, input/output unit 412 may send output to a printer. Display 414 provides a mechanism to display information to a user.

Instructions for at least one of the operating system, applications, or programs may be located in storage devices 416, which are in communication with processor unit 404 through communications framework 402. The processes of the different embodiments may be performed by processor unit 404 using computer-implemented instructions, which may be located in a memory, such as memory 406.

These instructions are referred to as program code, computer usable program code, or computer readable program code that may be read and executed by a processor in processor unit 404. The program code in the different embodiments may be embodied on different physical or computer readable storage media, such as memory 406 or persistent storage 408.

Program code 418 is located in a functional form on computer readable media 420 that is selectively removable and may be loaded onto or transferred to data processing system 400 for execution by processor unit 404. Program code 418 and computer readable media 420 form computer program product 422 in these illustrative examples. In one example, computer readable media 420 may be computer readable storage media 424 or computer readable signal media 426.

In these illustrative examples, computer readable storage media 424 is a physical or tangible storage device used to store program code 418 rather than a medium that propagates or transmits program code 418.

Alternatively, program code 418 may be transferred to data processing system 400 using computer readable signal media 426. Computer readable signal media 426 may be, for example, a propagated data signal containing program code 418. For example, computer readable signal media 426 may be at least one of an electromagnetic signal, an optical signal, or any other suitable type of signal. These signals may be transmitted over at least one of communications links, such as wireless communications links, optical fiber cable, coaxial cable, a wire, or any other suitable type of communications link.

The different components illustrated for data processing system 400 are not meant to provide architectural limitations to the manner in which different embodiments may be implemented. The different illustrative embodiments may be implemented in a data processing system including components in addition to or in place of those illustrated for data processing system 400. Other components shown in FIG. 4 can be varied from the illustrative examples shown. The different embodiments may be implemented using any hardware device or system capable of running program code 418.

Thus, one or more of the illustrative examples provide a method and apparatus to overcome the complexities and time needed to determine statistically-relevant business insights into human resources information for an organization. One or more illustrative examples provide a technical solution that involves determining business insights for an organization based on a comparison to human resources data 128 for a peer group of benchmark organizations 130 identified from organizations 106. Determining the business insights for an organization in this manner reduces the amount of time, effort, or both in the performance of operations for the organization.

The implementation of a human resources modeling system provides an ability to implement a competitive human resources capital management strategy for the organization more easily as compared to current systems. When business insights are determined in this manner, the business insights may be relied upon to perform operations for an organization.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component may be configured to perform the action or operation described. For example, the component may have a configuration or design for a structure that provides the component an ability to perform the action or operation that is described in the illustrative examples as being performed by the component.

Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for digitally presenting statistically-relevant business insights into a set of business metrics for an organization, the method comprising:
   identifying, by a human resources modeling system of a computer system, a set of organizational characteristics from human resources data of employees of a plurality of organizations;
   selecting, using a graphical user interface of a display system of the computer system, an inclusion criteria that includes at least one organizational characteristic selected from the set of organizational characteristics;
   applying, by a panel generator of the computer system, the inclusion criteria to the set of organizational characteristics to identify a set of candidate organizations by rule in or out of different ones of organizations from the set of candidate organizations;
   identifying, by the panel generator of the computer system, a plurality of benchmark organizations from the set of candidate organizations comprising identifying an underrepresented trait based on a distribution imbalance in an organizational characteristic for the set of candidate organizations, wherein the set of benchmark organizations does not have the underrepresented trait of the organizational characteristic;
   creating, by the panel generator of the computer system, a fixed panel of the benchmark organizations;
   applying, by an insight engine of the computer system, the fixed panel to the human resources data of employees of a plurality of organizations to create an analysis dataset, wherein the analysis dataset consists of human resources data of employees of the benchmark organizations;
   generating, by the insight engine of the computer system, a statistically-relevant business insight into the set of business metrics for the organization based on the analysis dataset and machine intelligence implemented by the insight engine using one or more of an artificial intelligence system, a neural network, a Bayesian network, an expert system, a fuzzy logic system, and a genetic algorithm; and
   digitally presenting automatically, using the graphical user interface of the display system of the computer system, the statistically-relevant business insight and the inclusion criteria,
   wherein selecting the inclusion criteria increases homogeneity of a sample population, reduces confounding, and increases likelihood of finding a true association among explanatory variables in a peer group.

2. The method of claim 1, wherein identifying the set of benchmark organizations further comprises:
   identifying the set of benchmark organizations from the set of candidate organizations, wherein the set of benchmark organizations does not have the underrepresented trait of the organizational characteristic.

3. The method of claim 1, wherein identifying the set of organizational characteristics further comprises:
   identifying the set of organizational characteristics from the human resources data of employees of the plurality of organizations, wherein the organizational characteristics are selected from a payroll services beginning date, a payroll services ending date, an industry of the organization, a sub industry of the organization, a geographic region of the organization, a number of employees of the organization, a collection of job codes of the organization, a range of salary amounts of the organization, and a range of part-time to full-time employees of the organization.

4. The method of claim 1, wherein the selected inclusion criteria is at least one organizational characteristic selected from the set of organizational characteristics identified from the human resources data of employees of the plurality of organizations.

5. The method of claim 4, further comprising:
   generating a set of distributions for a set of facts of human resources data based on the selected inclusion criteria.

6. The method of claim 5, further comprising:
   generating a set of statistics for the set of organizational characteristics in relation to the set of distributions.

7. The method of claim 6, wherein the set of statistics comprises at least one of an absolute difference, a percentage difference, a Z-score, a p-value, a percentile rank, and combinations thereof.

8. The method of claim 1, wherein the insight engine models an analysis data set using one or more panel data regression models, and further comprising:
performing, by the computer system, an operation for the organization based on the statistically-relevant business insight, wherein the operation is enabled based on the statistically-relevant business insight, wherein the set of business metrics includes organization metrics that relate to a tenure of employees, wherein the organization metrics include a span of control metric.

9. The method of claim 8, wherein the operation includes at least one of hiring operations, benefits administration operations, payroll operations, performance review operations, forming teams for new products, and assigning research projects.

10. A computer system for digitally presenting statistically-relevant business insights into a set of business metrics for an organization comprising:
a hardware processor;
a display system including a graphical user interface;
a panel generator in communication with the hardware processor and the display system; and
an insight engine in communication with the hardware processor and the display system:
wherein a human resources modeling system of the computer system identifies a set of organizational characteristics from human resources data of employees of a plurality of organizations;
wherein the graphical user interface of a display system selects an inclusion criteria that includes at least one organizational characteristic selected from the set of organizational characteristics;
wherein the panel generator applies the inclusion criteria to the set of organizational characteristics to identify a set of candidate organizations by rule in or out of different ones of organizations from the set of candidate organizations;
wherein the panel generator identifies a plurality of benchmark organizations from the set of candidate organizations comprising identifying an underrepresented trait based on a distribution imbalance in an organizational characteristic for the set of candidate organizations, wherein the set of benchmark organizations does not have the underrepresented trait of the organizational characteristic;
wherein the panel generator creates a fixed panel of the benchmark organizations;
wherein the insight engine applies the fixed panel to the human resources data of employees of a plurality of organizations to create an analysis dataset, wherein the analysis dataset consists of human resources data of employees of the benchmark organizations;
wherein the insight engine generates a statistically-relevant business insight into the set of business metrics for the organization based on the analysis dataset and machine intelligence implemented by the insight engine using one or more of an artificial intelligence system, a neural network, a Bayesian network, an expert system, a fuzzy logic system, and a genetic algorithm; and
wherein the graphical user interface of the display system digitally presents automatically the statistically-relevant business insight and the inclusion criteria,
wherein selecting the inclusion criteria increases homogeneity of a sample population, reduces confounding, and increases likelihood of finding a true association among explanatory variables in a peer group.

11. The computer system of claim 10, wherein the insight engine identifying the set of benchmark organizations further comprises:
identifying the set of benchmark organizations from the set of candidate organizations, wherein the set of benchmark organizations does not have the underrepresented trait of the organizational characteristic.

12. The computer system of claim 10, wherein the insight engine identifying the set of organizational characteristics further comprises:
identifying the set of organizational characteristics from the human resources data of employees of the plurality of organizations, wherein the organizational characteristics are selected from a payroll services beginning date, a payroll services ending date, an industry of the organization, a sub industry of the organization, a geographic region of the organization, a number of employees of the organization, a collection of job codes of the organization, a range of salary amounts of the organization, and a range of part-time to full-time employees of the organization.

13. The computer system of claim 10, wherein the selected inclusion criteria is at least one organizational characteristic selected from the set of organizational characteristics identified from the human resources data of employees of the plurality of organizations.

14. The computer system of claim 13, wherein the insight engine further:
generates a set of distributions for a set of facts of human resources data based on the selected inclusion criteria.

15. The computer system of claim 14, wherein the insight engine further:
generates a set of statistics for the set of organizational characteristics in relation to the set of distributions.

16. The computer system of claim 15, wherein the set of statistics comprises at least one of an absolute difference, a percentage difference, a Z-score, a p-value, a percentile rank, and combinations thereof.

17. The computer system of claim 10, wherein the insight engine models an analysis data set using one or more panel data regression models, and wherein the computer system:
performs an operation for the organization based on the statistically-relevant business insight, wherein the operation is enabled based on the statistically-relevant business insight, wherein the set of business metrics includes organization metrics that relate to a tenure of employees, wherein the organization metrics include a span of control metric.

18. The computer system of claim 17, wherein the operation includes at least one of hiring operations, benefits administration operations, payroll operations, performance review operations, forming teams for new products, and assigning research projects.

19. A computer program product for digitally presenting statistically-relevant business insights into a set of business metrics for an organization, the computer program product comprising:
a computer readable storage media;
program code, stored on the computer readable storage media, for identifying, by a human resources modeling system of a computer system, a set of organizational characteristics from human resources data of employees of a plurality of organizations;

program code, stored on the computer readable storage media, for selecting, using a graphical user interface of a display system, an inclusion criteria that includes at least one organizational characteristic selected from the set of organizational characteristics;

program code, stored on the computer readable storage media, for applying, by a panel generator of the computer system, the inclusion criteria to the set of organizational characteristics to identify a set of candidate organizations by rule in or out of different ones of organizations from the set of candidate organizations;

program code, stored on the computer readable storage media, for identifying, by the panel generator of the computer system, a plurality of benchmark organizations from the set of candidate organizations comprising program code, stored on the computer readable storage media, for identifying an underrepresented trait based on a distribution imbalance in an organizational characteristic for the set of candidate organizations, wherein the set of benchmark organizations does not have the underrepresented trait of the organizational characteristic;

program code, stored on the computer readable storage media, for creating, by the panel generator of a computer system, a fixed panel of the benchmark organizations;

program code, stored on the computer readable storage media, for applying the fixed panel to the human resources data of employees of a plurality of organizations to create an analysis dataset, wherein the analysis dataset consists of human resources data of employees of the benchmark organizations;

program code, stored on the computer readable storage media, for generating a statistically-relevant business insight into the set of business metrics for the organization based on the analysis dataset and machine intelligence implemented by the insight engine using one or more of an artificial intelligence system, a neural network, a Bayesian network, an expert system, a fuzzy logic system, and a genetic algorithm; and program code, stored on the computer readable storage media, for digitally presenting automatically, using the graphical user interface of the display system, the statistically-relevant business insight and the inclusion criteria, wherein selecting the inclusion criteria increases homogeneity of a sample population, reduces confounding, and increases likelihood of finding a true association among explanatory variables is a peer group.

20. The computer program product of claim 19, wherein the program code for identifying the set of benchmark organizations further comprises:
program code, stored on the computer readable storage media, for identifying the set of benchmark organizations from the set of candidate organizations, wherein the set of benchmark organizations does not have the underrepresented trait of the organizational characteristic.

21. The computer program product of claim 19, wherein the program code for identifying the set of organizational characteristics further comprises:
program code, stored on the computer readable storage media, for identifying the set of organizational characteristics from the human resources data of employees of the plurality of organizations, wherein the organizational characteristics are selected from a payroll services beginning date, a payroll services ending date, an industry of the organization, a sub industry of the organization, a geographic region of the organization, a number of employees of the organization, a collection of job codes of the organization, a range of salary amounts of the organization, and a range of part-time to full-time employees of the organization.

22. The computer program product of claim 19, wherein the selected inclusion criteria is at least one organizational characteristic selected from the set of organizational characteristics identified from the human resources data of employees of the plurality of organizations.

23. The computer program product of claim 22, further comprising:
program code, stored on the computer readable storage media, for generating a set of distributions for a set of facts of human resources data based on the selected inclusion criteria.

24. The computer program product of claim 23, further comprising:
program code, stored on the computer readable storage media, for generating a set of statistics for the set of organizational characteristics in relation to the set of distributions.

25. The computer program product of claim 24, wherein the set of statistics comprises at least one of an absolute difference, a percentage difference, a Z-score, a p-value, a percentile rank, and combinations thereof.

26. The computer program product of claim 19, wherein the insight engine models an analysis data set using one or more panel data regression models, and further comprising:
program code, stored on the computer readable storage media, for performing an operation for the organization based on the statistically-relevant business insight, wherein the operation is enabled based on the statistically-relevant business insight, wherein the set of business metrics includes organization metrics that relate to a tenure of employees, wherein the organization metrics include a span of control metric.

27. The computer program product of claim 26, wherein the operation includes at least one of hiring operations, benefits administration operations, payroll operations, performance review operations, forming teams for new products, and assigning research projects.

* * * * *